United States Patent
Matsuhashi

(10) Patent No.: US 6,999,902 B2
(45) Date of Patent: Feb. 14, 2006

(54) APPARATUS, METHOD, AND PROGRAM FOR MANAGING PRODUCTS

(75) Inventor: Toyoaki Matsuhashi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 164 days.

(21) Appl. No.: 10/635,813

(22) Filed: Aug. 5, 2003

(65) Prior Publication Data

US 2004/0098214 A1    May 20, 2004

(30) Foreign Application Priority Data

Aug. 26, 2002 (JP) ............................ P2002-245823

(51) Int. Cl.
*G06F 11/00* (2006.01)
*G06F 15/00* (2006.01)

(52) U.S. Cl. ..................................... 702/188

(58) Field of Classification Search ............ 702/81–84, 702/182–185, 188; 714/25, 38, 41
See application file for complete search history.

(56) References Cited

U.S. PATENT DOCUMENTS

2003/0237028 A1 * 12/2003 Mantyla ...................... 714/38

FOREIGN PATENT DOCUMENTS

| JP | 10-154181 | | 6/1998 |
|---|---|---|---|
| JP | 2001-028406 | * | 1/2001 |
| JP | 2001-195119 | | 7/2001 |

* cited by examiner

*Primary Examiner*—Michael Nghiem
(74) *Attorney, Agent, or Firm*—Brenda O. Holmes; Kilpatrick Stockton LLP

(57) ABSTRACT

An apparatus for managing a plurality of products, including a receiver configured to receive product information including measured values from at least two products in use, an average computation unit configured to compute an average of values collected from the same item in each part of the received product information, a storage unit configured to store reliability specification values and reliability specification rewrite conditions in advance, a comparator configured to compare the computed average with one of the corresponding stored reliability specification values and provide a first comparison result, and a rewrite unit configured to rewrite the corresponding reliability specification value stored in the storage unit with the computed average when the first comparison result indicates that the reliability specification rewrite conditions are satisfied.

9 Claims, 7 Drawing Sheets

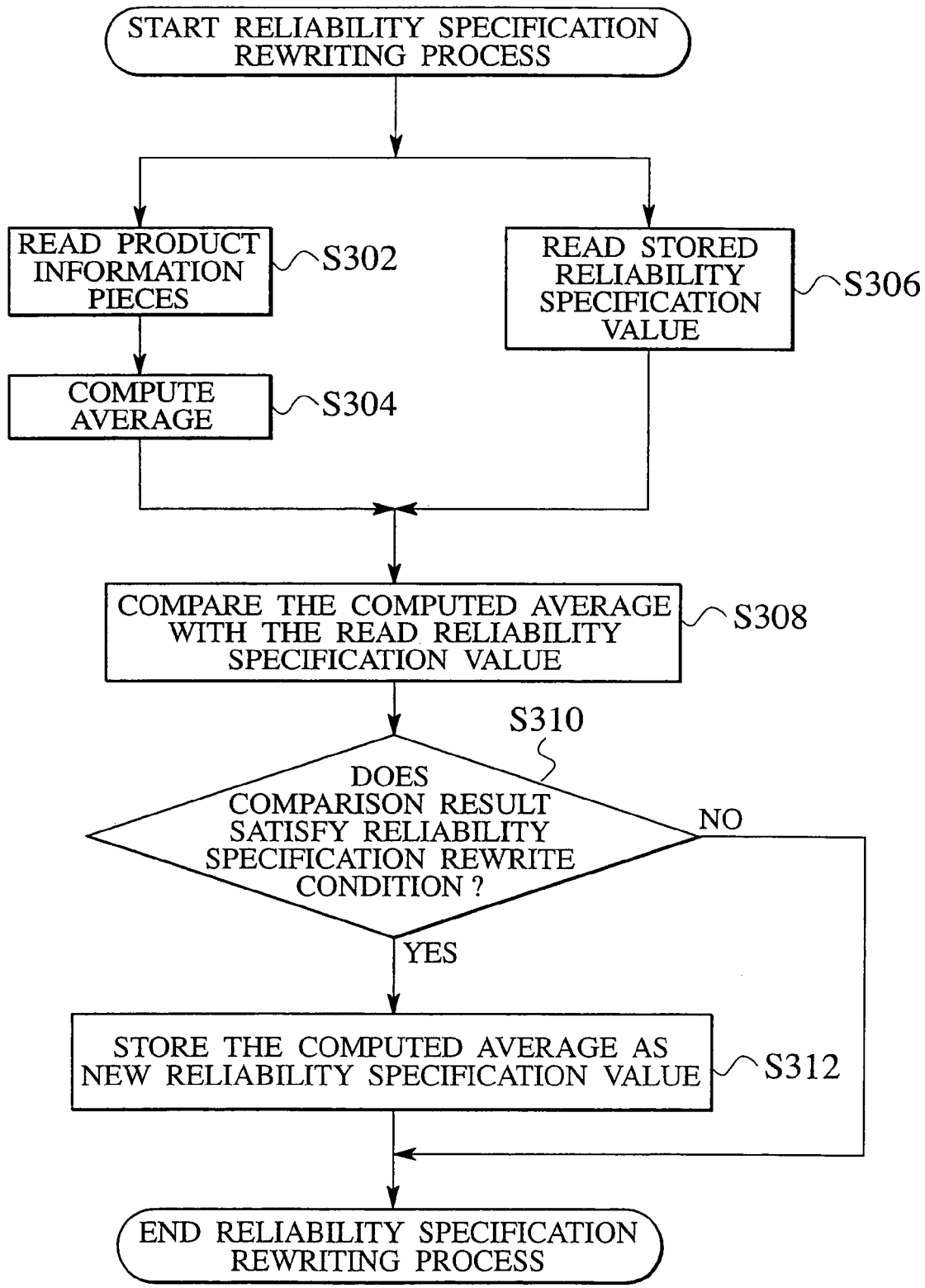

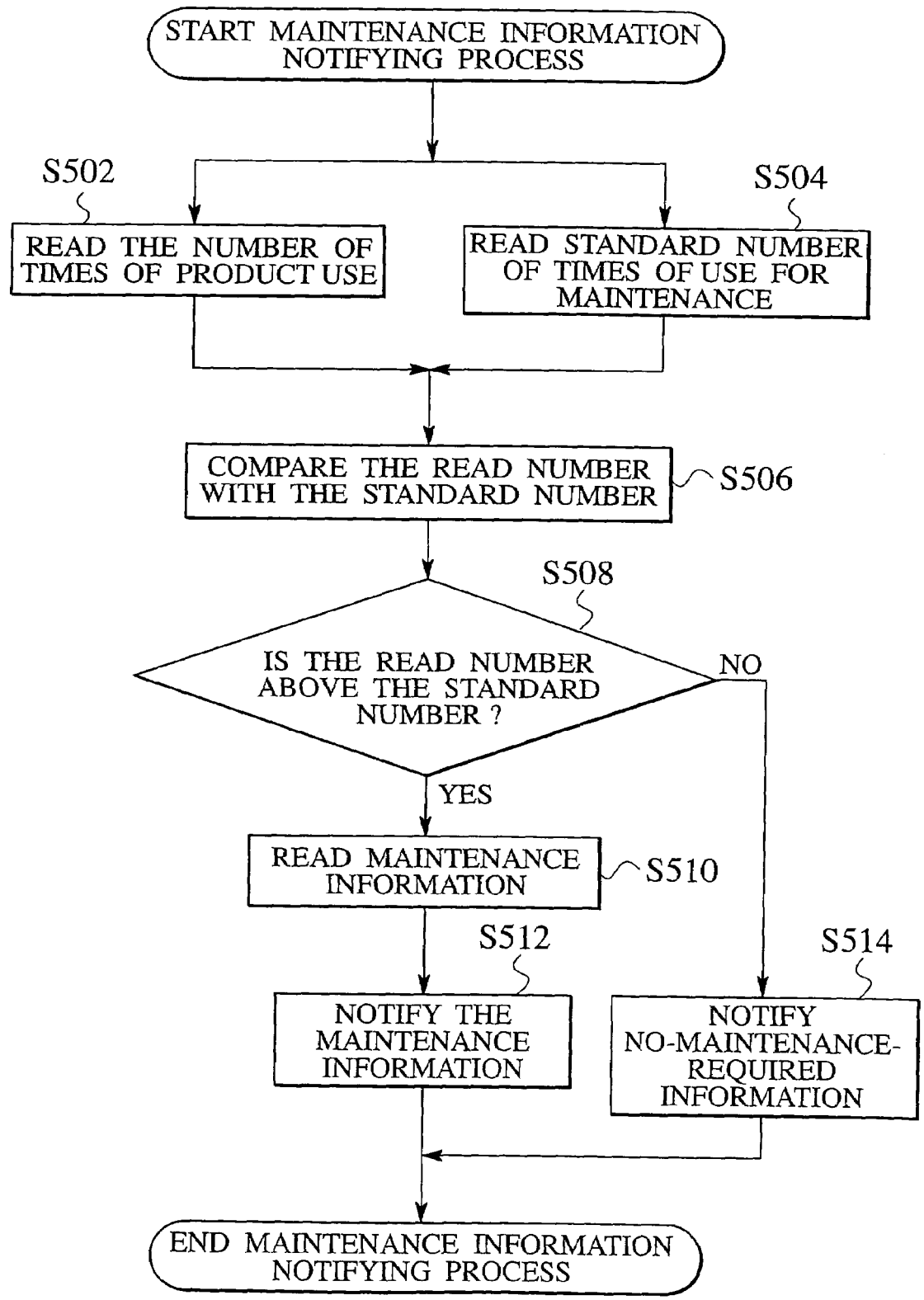

APPARATUS, METHOD, AND PROGRAM FOR MANAGING PRODUCTS

CROSS REFERENCE TO RELATED APPLICATIONS

This application is based upon and claims the benefit of priority from the prior Japanese Patent Application No. 2002-245823 filed on Aug. 26, 2002; the entire contents of which are incorporated herein by reference.

BACKGROUND OF THE INVENTION

1. Field of the Invention

The present invention relates to an apparatus, a method, and a program capable of providing proper information such as advice and solutions to products that need maintenance or have problems.

2. Description of Related Art

Products, for example, automobiles must receive regular inspections including compulsory inspections. Inspections other than the compulsory inspections are usually carried out by the users according to manuals. Related arts that help the users carry out inspections have some problems.

The users frequently forget to regularly conduct inspections. If no regular inspections are carried out, the products may easily suffer trouble and thus, have a shorter service lives. When carrying out inspections according to manuals, the users may encounter problems such as understanding the manuals and how to conduct the inspections.

If a product causes a problem, the user may call a service center for advice. Talking on the telephone, however, is usually insufficient for the service center to correctly identify the cause of the problem. In this case, the user must send or carry the product to the service center and must wait for several days or weeks until the product is inspected, repaired, and returned to the user.

If the user does not send or take the problematic product to the service center, the manufacturer of the product will be unable to obtain proper information about the problem of the product, and therefore, will be unable to utilize this information for improving the product or developing a new product.

SUMMARY OF THE INVENTION

An aspect of the present invention provides an apparatus for managing a plurality of products, including a receiver configured to receive product information including measured values from at least two products in use, an average computation unit configured to compute an average of values collected from the same item in each part of the received product information, a storage unit configured to store reliability specification values and reliability specification rewrite conditions in advance, a comparator configured to compare the computed average with one of the corresponding stored reliability specification values and provide a first comparison result, and a rewrite unit configured to rewrite the corresponding reliability specification value stored in the storage unit with the computed average when the first comparison result indicates that the reliability specification rewrite conditions are satisfied.

Another aspect of the present invention provides an apparatus for managing a plurality of products, including a receiver configured to receive product information from a product in use, a storage unit configured to store a value for a maintenance item and maintenance information related to the maintenance item in advance, an comparator configured to compare a value for the maintenance item extracted from the received product information with the value for the maintenance item stored in the storage unit and provide a third comparison result, and a transmitter configured to transmit the maintenance information to the product when the third comparison result indicates that the value extracted from the received product information agrees with the value stored in the storage unit.

Another aspect of the present invention provides an apparatus for managing a plurality of products, including a receiver configured to receive first product information from a first product in use and second product information from a second product in use, a storage unit configured to store problem information and remedial information related to the problem information in advance, a problem check unit configured to check to determine if at least one of the first and second product information parts contains the problem information and provide a check result, a reader configured to read remedial information from the storage unit when the check result indicates that at least one of the first and second product information parts contains the problem information, and a transmitter configured to transmit the remedial information read by the reader to each of the first and second products.

Another aspect of the present invention provides a method of managing products carried out with an apparatus for receiving product information from the products, including receiving product information including measured values from at least two products in use, computing an average of values collected from the same item in each part of the received product information, storing reliability specification values and reliability specification rewrite conditions in advance, comparing the computed average with one of the corresponding stored reliability specification values and providing a first comparison result, and rewriting the stored corresponding reliability specification value with the computed average when the first comparison result indicates that the reliability specification rewrite conditions are satisfied.

Another aspect of the present invention provides a method of managing a plurality of products, including receiving product information from a product in use, storing a value for a maintenance item and maintenance information related to the maintenance item in advance, comparing a value for the maintenance item extracted from the received product information with the stored value for the maintenance item and providing a third comparison result, and transmitting the maintenance information to the product when the third comparison result indicates that the value extracted from the received product information agrees with the stored value.

Another aspect of the present invention provides a method of managing a plurality of products, including receiving first product information from a first product in use and second product information from a second product in use, checking to determine if at least one of the first and second product information parts contains problem information agreeing with that stored in advance and providing a check result, reading remedial information stored in advance in connection with the problem information when the check result indicates that at least one of the first and second product information parts contains the problem information, and transmitting the read remedial information to each of the first and second products.

BRIEF DESCRIPTION OF THE DRAWINGS

FIG. 3 is a flowchart showing a process of rewriting or changing reliability specification values according to an embodiment of the present invention;

FIG. 6 is a flowchart showing a process of notifying maintenance information according to an embodiment of the present invention.

DETAILED DESCRIPTION OF EMBODIMENTS

Figure 1:
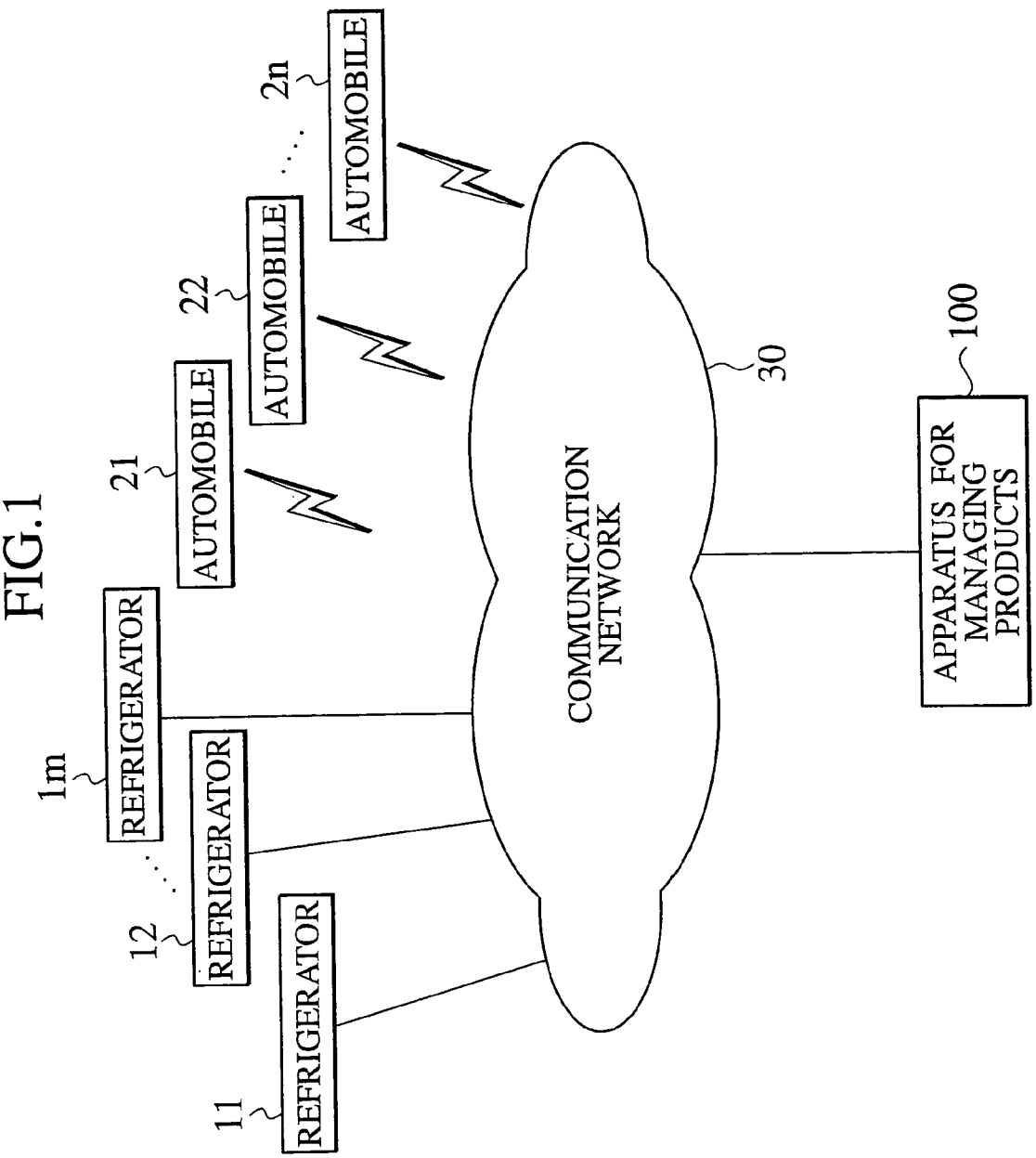
FIG. 1 shows an apparatus for managing products according to an embodiment of the present invention and products to be managed by the apparatus.

Various embodiments of the present invention will be described with reference to the accompanying drawings. It is to be noted that same or similar reference numerals are applied to the same or similar parts and elements throughout the drawings, and the description of the same or similar parts and elements will be omitted or simplified.

FIG. 1 shows an apparatus for managing products according to an embodiment of the present invention and products to be managed by the apparatus. The apparatus 100 for managing products communicates with products to be managed such as refrigerators 11 to 1m and automobiles 21 to 2n through a communication network 30. The communication network 30 involves wired communication to communicate with stationary products such as the refrigerators 11 to 1m and wireless communication to communicate with mobile products such as the automobiles 21 to 2n. Naturally, the stationary products may employ wireless circuits.

Figure 2:
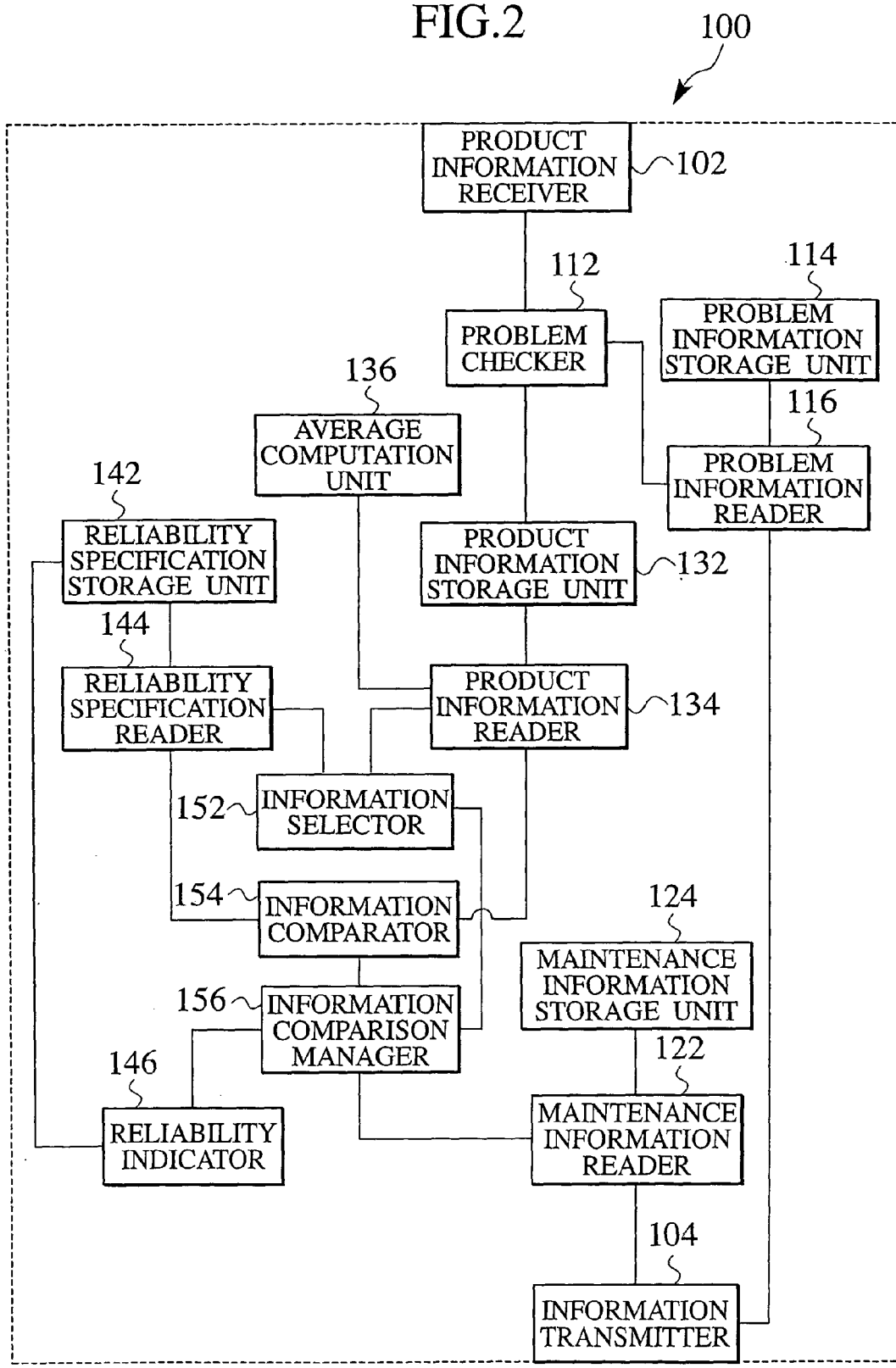
FIG. 2 is a block diagram showing an example of the apparatus of FIG. 1.

FIG. 2 shows an exemplary structure of the apparatus 100 for managing products according to an embodiment of the present invention. The apparatus 100 includes a product information receiver 102, an information transmitter 104, a problem checker 112, a problem information storage unit 114, a problem information reader 116, a maintenance information reader 122, a maintenance information storage unit 124, a product information storage unit 132, a product information reader 134, an average computation unit 136, a reliability specification storage unit 142, a reliability specification reader 144, a reliability indicator 146, an information selector 152, an information comparator 154, and an information comparison manager 156.

The product information receiver 102 receives product information transmitted from products including the refrigerators 11 to 1m and automobiles 21 to 2n through the communication network 30. The product information may include, for each product, a product identifier code, conditions of use, parts data, and the owner (user) of the product. In the case of the refrigerator, the product information may include an inside temperature, an ambient temperature, power consumption, the number of times the door has been opened and closed, a coolant pressure, a coolant quantity, and compressor specifications. In the case of the automobile, the product information may include a traveled distance, the number of times the brakes have been used, an averaged engine speed, fuel consumption, a driving weight, a battery voltage, an ambient temperature during driving, an ambient luminance, and tire specifications. These parts of information are regularly or irregularly transmitted from each product to the apparatus 100. The apparatus 100 may receive the product information every hour from a product such as a refrigerator that is continuously operated for 24 hours a day, 365 days a year. The apparatus 100 may receive the information at different intervals, for example, a refrigerator's inside temperature every two hours and a coolant quantity every 24 hours. From a product such as an automobile that is not always continuously operated, the apparatus 100 may receive the product information only during the operation of the product.

The information transmitter 104 transmits information to the products including the refrigerators 11 to 1m and automobiles 21 to 2n through the communication network 30. The information transmitted from the transmitter 104 may be received by a receiver (not shown) provided for each product. If the product has no means to display the received information, the information from the transmitter 104 may be sent to a mail address related to the product. The mail address may be that of an owner or a manager of the product. The information transmitted from the transmitter 104 may consist of characters or any combination of characters, voice, still images, motion images, and the like. The information from the transmitter 104 may include usage advice, maintenance information, and problem information related to the product. For instance, the usage advice will be, for a refrigerator, "Increase the set temperature" if the power consumption of the refrigerator is too high in winter. The maintenance information may be, for an automobile, "Change engine oil, traveled distance reached X km" or "Charge battery, battery voltage is low." The problem information will be, for a refrigerator, "Service person will be dispatched to replenish coolant because of coolant shortage and insufficient cooling," and for an automobile, "Change brake pad, service life thereof found to be shorter than expected." Instead of transmitting the advice information, the transmitter 104 can send only information needed to access the advice information. For example, the transmitter 104 can send a URL (uniform resource locator) of a web site that provides the advice information.

The problem checker 112 checks to see if product information received from a product through the receiver 102 contains information indicating a problem occurring in the product. If problem information is found in the product information, the problem checker 112 instructs the problem information reader 116 to read remedial information corresponding to the problem information. The reader 116 reads the remedial information from the problem information storage unit 114 and transmits the same through the information transmitter 104. The problem information contained in the received product information may be used to compute a value or factor, discussed in more detail below, which is compared with a value stored in the storage unit 114 multiplied by a predetermined value. According to a result of the comparison, the remedial information is read out of the storage unit 114 and transmitted from the transmitter 104. For example, a deterioration factor is computed from the received product information, and if the deterioration factor is greater than a deterioration factor stored in the storage unit 114 multiplied by a predetermined value, it is determined that the product has a problem. Then, remedial information related to the problem is transmitted through the transmitter 104. The predetermined value serving as a multiplier applied to the deterioration factor is dependent on the product or a part of the product.

Instead of transmitting remedial information, information needed to access the remedial information can be transmitted as stated above. The problem information storage unit 114 has a function of previously storing problem information corresponding to problem information or claims which may be transmitted from products and a function of storing the problem information and claims transmitted from products in time series.

If product information transmitted from a product contains information indicating that the product needs maintenance, the maintenance information reader 122 retrieves maintenance information appropriate for the product information from the maintenance information storage unit 124 and transmits the retrieved maintenance information through the transmitter 104. Instead of transmitting the maintenance information, information needed to access the maintenance information can be transmitted as stated above.

The product information storage unit 132 stores product information received through the product information receiver 102. The storage unit 132 employs a table format storing the conditions of use of each product (for example, the number of times of use of the product and the state of the product, e.g. a deterioration state) of each customer and the environmental conditions of the product (for example, the temperature, humidity, and date and time of use of the product).

The reliability specification storage unit 142 stores the reliability specifications of each product. The reliability specifications of a product are prepared by a manufacturer of the product or by manufacturers of parts of the product and may be experimental or theoretical. The reliability specifications in the storage unit 142 may be in graphs or tables and may relate to the reliability, maintenance, and inspection of each product or part.

The reliability specifications of a product include relationships between the number of times of use of the product and deterioration factors thereof, the relationships indicating the degrees of deterioration of the product relative to the number of times of use of the product. The relationships between the number of times of use of a product and deterioration factors or service life thereof are dependent on the type of the product, and therefore, the reliability specifications are prepared for each product type. Product information received from a product through the receiver 102 contains a value for a maintenance item. This value is compared with a value for the same maintenance item stored in the reliability specification storage unit 142. If a result of the comparison so instructs, maintenance information for the maintenance item is retrieved from the storage unit 142 and is transmitted from the transmitter 104 to the product. For example, if the number of times of use of the product contained in the received product information is greater than a corresponding value stored in the storage unit 142, corresponding maintenance information is retrieved from the storage unit 142 and is transmitted from the transmitter 104 to the product.

The product information storage unit 132 and reliability specification storage unit 142 have the same data items and formats except data values.

The product information reader 134 can read product information from the product information storage unit 132 for each customer, for each item of product usage conditions, or for each item of product usage environments.

The average computation unit 136 computes an average of values collected from the same item in the product information parts stored in the product information storage unit 132. The product information data for which the average is computed are those transmitted from products of the same type used in like environments. For example, the average computation unit 136 computes an average of deterioration factors collected from refrigerators of the same type used in like environments, for example, in an ambient temperature range of 15 to 24 degrees centigrade.

The reliability specification reader 144 reads, from the reliability specification storage unit 142, customer by customer information, or product usage condition according to condition, or product usage environment according to environment.

The reliability indicator 146 can temporarily store information in the same format as the reliability specification storage unit 142, can change information stored in itself according to information from the information comparison manager 156, and can change information stored in the reliability specification storage unit 142 according to changes made in itself. If a reliability specification value stored in the reliability specification storage unit 142 differs from a reliability specification value computed from information received through the product information receiver 102 by a predetermined degree, the reliability indicator 146 rewrites the reliability specification value stored in the storage unit 142 with the reliability specification value calculated from the information. The predetermined degree used to determine whether or not a stored reliability specification value must be rewritten is, for example, a percentage of ±5% or ±10% by which a reliability specification value calculated from information deviates from the stored reliability specification value.

Figure 4A:
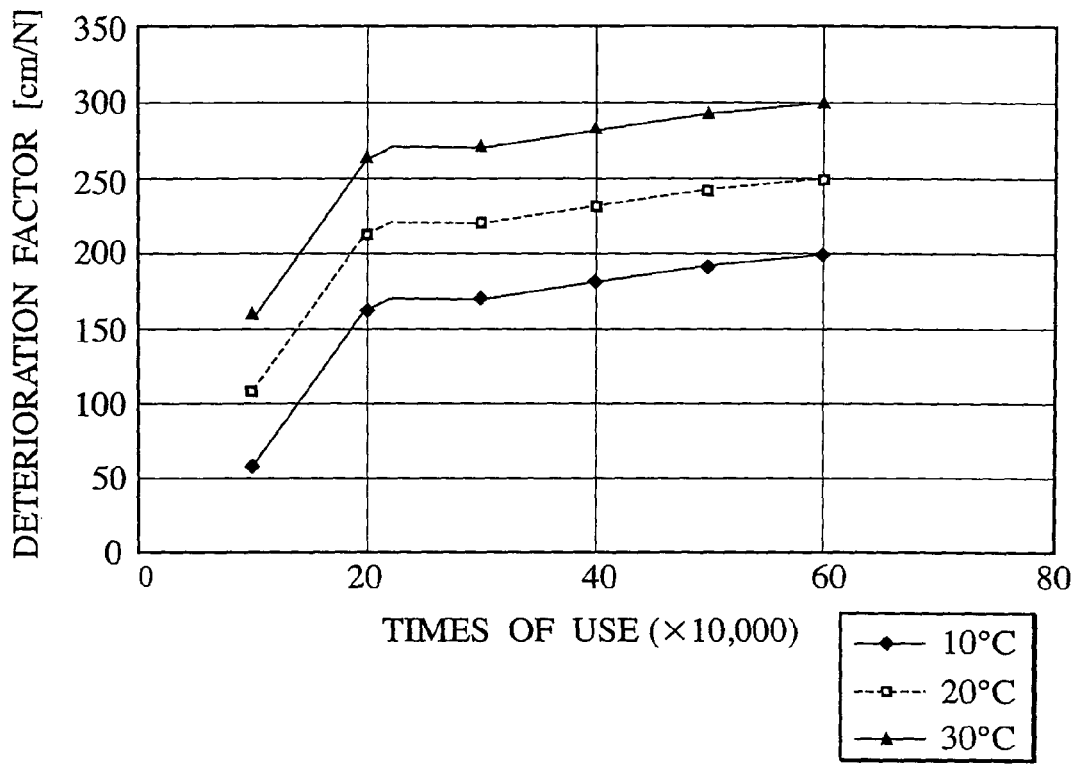
FIG. 4A is a graph showing relationships between the numbers of times of use of products and initial deterioration factors (reliability specification values) thereof.

FIG. 4A is a graph showing initial specification values prepared from data measured by a manufacturer, data extrapolated from measured data, and data estimated from existing data.

Data used to compute a deterioration factor is transmitted from each product whenever the number of times of use of the product reaches a predetermined value. For example, when the number of times of use of a product reaches 200,000, the product transmits data to be used for computing a deterioration factor for 200,000 times. When the number of times of use of the product reaches 300,000 and 400,000, the product transmits data parts to be used for computing deterioration factors for 300,000 and 400,000 times, respectively. For each product, the number of times of use to transmit data to be used for computing a deterioration factor is not limited to every 100,000. The number is optional, for example, every 50,000 or 10,000.

It is preferable that the reliability specification storage unit 142 stores reliability specification rewrite conditions including the threshold number of parts of deterioration factor data to be collected. For example, a reliability specification value stored in the storage unit 142 will not be rewritten even if a reliability specification value computed according to information collected from products deviates from the stored reliability specification value by the predetermined percentage, if the number of data parts used to compute the computed reliability specification value is below, for example, 60% of the number of products shipped. If the number of products shipped is 1,000,000, then a reliability specification value stored in the storage unit 142 in connection with the products will not be rewritten until the number of data parts collected from the products reaches 600,000. If 650,000 data parts are collected from products each having the number of times of use of 200,000 and 550,000 data parts from products each having the number of times of use of 400,000, then a reliability specification value for the products having the number of times of use of 200,000 may be rewritten because 650,000 is greater than 60% of 1,000,000. However, a reliability specification value for the products having the number of times of use of 400,000 will not be rewritten because 550,000 is less than 60% of 1,000,000. The percentage serving as a rewrite condition may be determined according to the number of products shipped, or it may be fixed to a certain value such as 50% or 70% of the number of products shipped.

According to an embodiment of the present invention, if a deterioration factor or a reliability specification value stored for a given type of product in the storage unit 142 is 250 for a certain number of times of use of the product and a certain temperature, and if an average of deterioration factors computed from information parts collected from more than 60% of the products shipped is lower than 237.5 (=250×0.95), the stored reliability specification value will be rewritten with 237.5.

In this way, if the number of collected information parts is above a predetermined value and if a reliability specification value computed from the collected information parts deviates from a stored reliability specification value by a predetermined range, the stored reliability specification value will be rewritten. If the difference between the reliability specification value computed from the collected information and the stored reliability specification value is within the predetermined range, or if the difference is out of the predetermined range with the number of collected data parts being smaller than the predetermined value, the stored reliability specification value will not be rewritten. A reliability specification value that is not initially stored in the storage unit 142 will be calculated from collected data parts as soon as the number of the collected data parts reaches the predetermined value and will be stored as a reliability specification value in the storage unit 142.

For example in FIG. 4A, initial reliability specification values (deterioration factors) for the number of times of use of just above 100,000 are available for 10, 20, and 30 degrees centigrade. However, there are no reliability specification values for the number of times of use of just 100,000 for each of 10, 20, and 30 degrees centigrade. Also, there are no reliability specification values for the number of times of use of 0 for each of 10, 20, and 30 degrees centigrade.

Figure 4B:
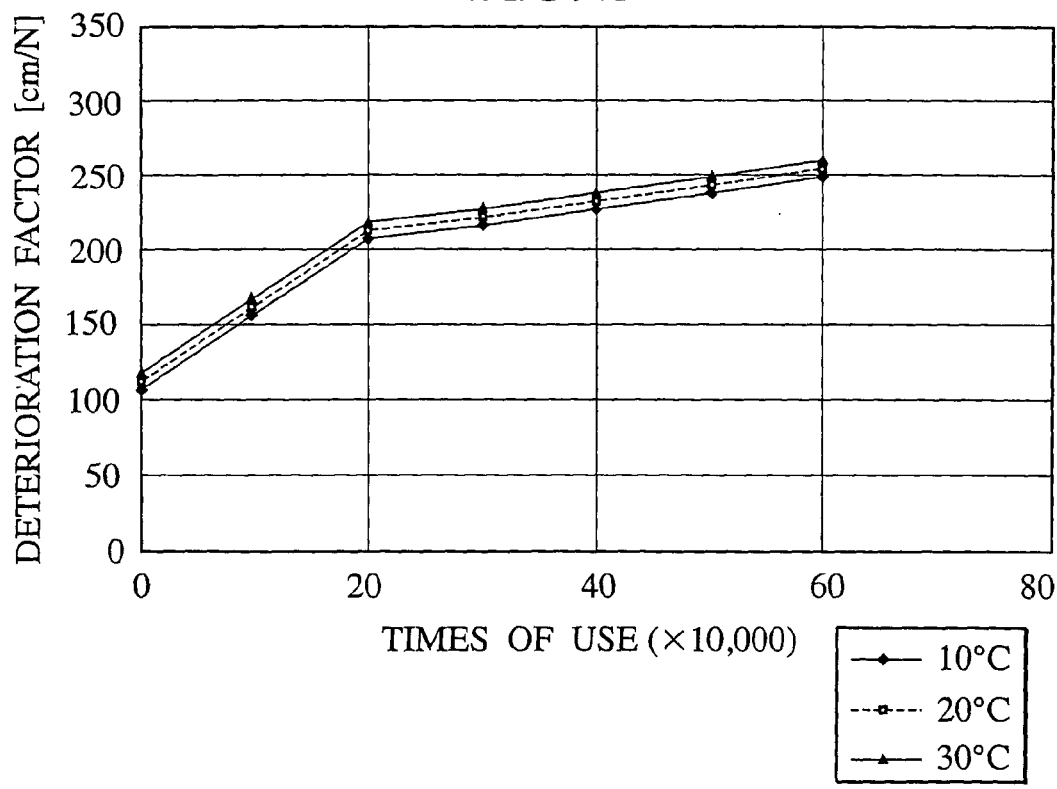
FIG. 4B is a graph showing relationships between the numbers of times of use of the products and deterioration factors thereof rewritten according to a large amount of measured data.
Figure 5A:
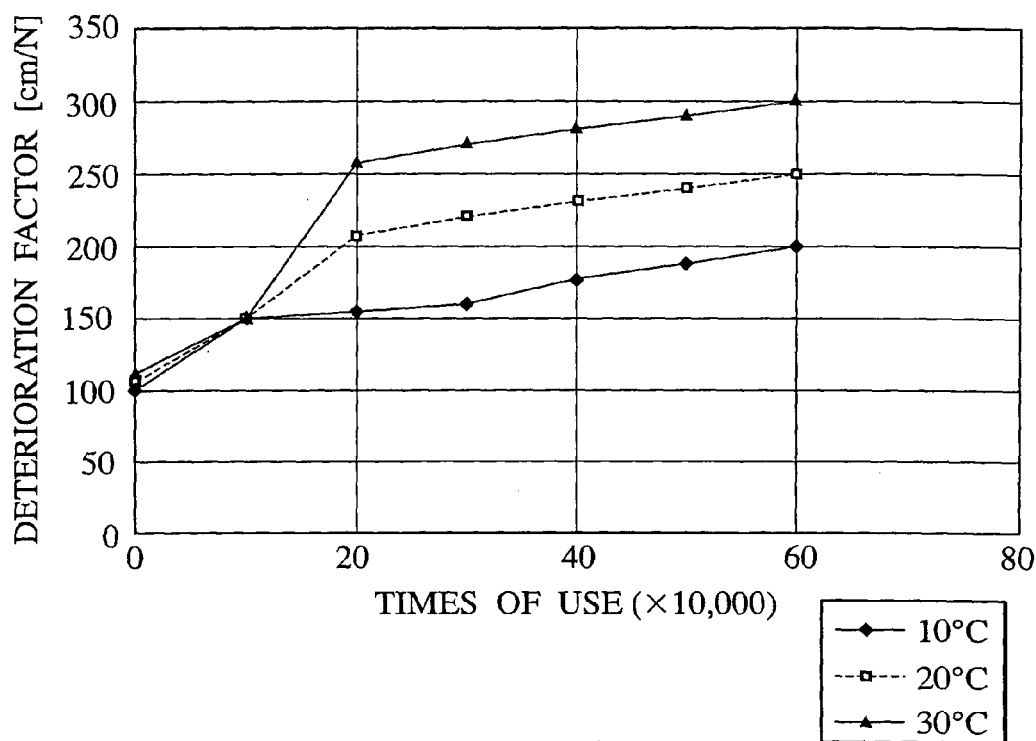
FIG. 5A is a graph showing relationships between the numbers of times of use of the products and deterioration factors thereof rewritten for 0 and 100,000 times of use according to FIGS. 4A and 4B.

FIG. 4B shows averages of deterioration factors (reliability specification values) computed from collected data. Reliability specification values for 0 and 100,000 times of use that are not available in FIG. 4A can be prepared by adding part of the graph of FIG. 4B to part of the graph of FIG. 4A as shown in FIG. 5A when the number of collected data parts for the 0 and 100,000 times of use exceeds the predetermined value.

Figure 5B:
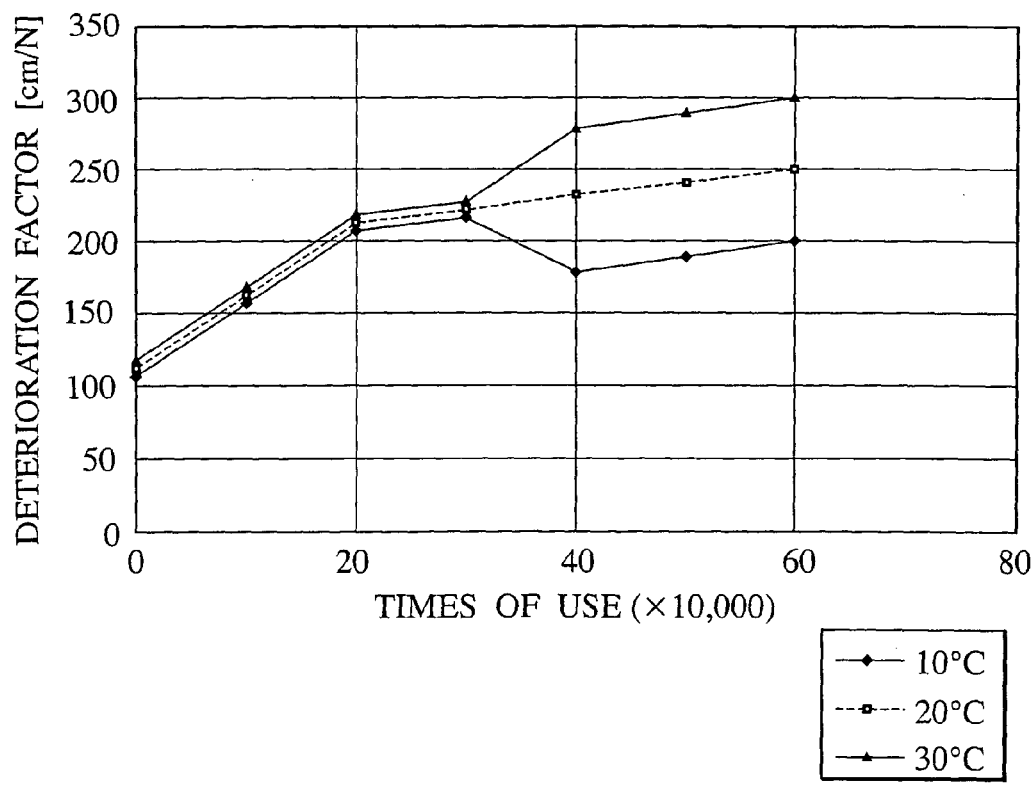
FIG. 5B is a graph showing relationships between the numbers of times of use of the products and deterioration factors thereof rewritten for 200,000 and 300,000 times of use and 10 and 30 degrees centigrade according to FIGS. 4B and 5A.

In FIG. 4B, averages of deterioration factors for 200,000 and 300,000 times of use for 10 and 30 degrees centigrade are below 95% or above 105% of the initial values shown in FIG. 4A. Accordingly, if the number of collected data parts in each case is above the predetermined value, the parts of the graph of FIG. 4B for 200,000 and 300,000 times of use for 10 and 30 degrees centigrade are used to rewrite the corresponding parts of the graph of FIG. 5A as shown in FIG. 5B. In connection with reliability specification values for 20 degrees centigrade in FIG. 5A, no change will be made because averages of deterioration factors for the temperature at 200,000 and 300,000 times of use are each above 95% and below 105% of the initial value.

In this way, if an average of deterioration factors or reliability specification values computed from data parts exceeding a predetermined value differs from an initial value stored in the storage unit 142 by a predetermined level or over, the initial value is rewritten with the computed average. Any part not covered by initial reliability specification values and not stored in the storage unit 142 can be added according to a computed average when the number of collected data parts for the part exceeds a predetermined value.

The information selector 152 instructs the product information reader 134 as to which information part must be read out of the product information storage unit 132 and transferred to the information comparator 154. Also, the information selector 152 instructs the reliability specification reader 144 as to which information part must be read out of the reliability specification storage unit 142 and transferred to the information comparator 154.

The information comparator 154 compares the information part transferred from the reader 134 with the information part transferred from the reader 144 and sends a comparison result to the information comparison manager 156.

According to the comparison result from the information comparator 154, the information comparison manager 156 (1) instructs the information selector 152 as to which information part must be read next and (2) instructs the reliability indicator 146 whether the information part in the storage unit 142 must be rewritten, and if it must be rewritten, how it must be rewritten.

Instructing which information part must be read next includes, for example, determining whether all information parts related to the refrigerator 11 have been read, if not, instructing the reading of the remaining information parts, and if all parts have been read, instructing the reading of an information part concerning the next refrigerator 12.

FIG. 3 is a flowchart showing a process of rewriting or changing reliability specification values according to an embodiment of the present invention. Step S302 reads a plurality of product information parts. Step S304 computes an average of reliability specification values extracted from the read information parts. In parallel with steps S302 and S304, step S306 reads a stored reliability specification value. Step S308 compares the computed average with the read reliability specification value. Step S310 determines whether a result of the comparison satisfies a reliability specification rewrite condition. If the comparison result satisfies the condition, step S312 stores the computed average as a new reliability specification value.

More precisely, in step S302, the product information reader 134 reads product information parts received through the product information receiver 102 and stored in the storage unit 132. It is preferable to start the following reliability specification rewriting (changing) process only when the number of product information parts stored in the storage unit 132 reaches a predetermined value, for example, 100,000 or 1,000,000. If the number of collected information parts is small, there will be variations among the information parts, and therefore, it is preferable to wait until the number reaches the predetermined value at which variations are small.

In step S304, the average computation unit 136 computes an average of the product information parts. The average computation unit 136 computes, for example, (1) an average of deterioration factors (reliability specification values) of products that have been used 200,000, 300,000, 400,000, 500,000, or 600,000 times at an ambient temperature of 10 degrees centigrade, (2) an average of deterioration factors of products that have been used 200,000, 300,000, 400,000, 500,000, or 600,000 times at an ambient temperature of 20 degrees centigrade, and (3) an average of deterioration factors of products that have been used 200,000, 300,000, 400,000, 500,000, or 600,000 times at an ambient temperature of 30 degrees centigrade and provides the graph of FIG. 4B.

An example of a deterioration factor or a reliability specification value will be explained. A push-button switch, for example, involves (1) a switch pressing force A (force applied to move the switch), (2) a distance (stroke) B the switch travels to turn ON, (3) a contact resistance value C in an ON state, and (4) an insulation resistance value D in an OFF state.

As the number of times of use of the switch increases, (1) the force A becomes smaller so that the switch may be turned on and off with smaller force, (2) the stroke B becomes more variable, (3) the contact resistance value C becomes larger, and (4) the insulation resistance value D gradually decreases from infinity to a certain value. A deterioration factor for this switch can be expressed as follows:

Deterioration factor=(stroke $B$× contact resistance $C$)/ (force $A$× insulation resistance $D$)

In step S306, the reliability specification reader 144 reads a reliability specification value (deterioration factor) stored in the reliability specification storage unit 142. Initial reliability specification values are stored in the storage unit 142 through an input unit (not shown). FIG. 4A shows such initial reliability specification values.

Step S308 compares the computed average (FIG. 4B) with the read reliability specification value (FIG. 4A). Step S310 determines whether a result of the comparison satisfies a reliability specification rewrite condition. For example, the graph of FIG. 4A is compared with the graph of FIG. 4B, and if a great difference is found between them, it is notified to an operator. The operator may determine that the stored reliability specification value must be rewritten with the computed reliability specification value. This determination is made according to the reliability specification rewrite condition. The difference between the graphs of FIGS. 4A and 4B will exceed the reliability specification rewrite condition when, for example, a direct proportional relationship between the numbers of times of use and deterioration factors changes to an inverse proportional relationship, or deterioration factors increasing with temperature increases change to decrease with temperature increases. If the graph of FIG. 4A is substantially equal to the graph of FIG. 4B, it is determined that the comparison result does not satisfy the reliability specification rewrite condition. If the difference between the graphs 4A and 4B is not so great so as to be informed to an operator but if the two graphs are not very equal to each other, it may be determined that the comparison result satisfies the reliability specification rewrite condition.

Step S312 stores the computed average as a new reliability specification value in the reliability specification storage unit 142. Namely, the graph of FIG. 4A is partly or wholly replaced with the graph of FIG. 4B.

Next, a maintenance information notifying process according to an embodiment of the present invention will be explained with reference to FIG. 6.

In FIG. 6, step S502 reads the number of times of use of a product. In parallel with step S502, step S504 reads a standard maintenance number. Step S506 compares the number read in step S502 with the standard maintenance number read in step S504. According to a result of the comparison, step S508 determines whether the number is above the standard maintenance number. If the number is above the standard maintenance number, step S510 reads maintenance information, and step S512 transmits the read maintenance information to the product (originator) that has transmitted the actual number of times of use. If the number is below the standard maintenance number, step S514 notifies the originator that no maintenance is needed.

More precisely, in step S502, the product information reader 134 reads information on each product received through the product information receiver 102 and stored in the product information storage unit 132. If the product is a refrigerator, the number of times of use of the product may be the number of times that the door has been opened and closed, and if the product is an automobile, it may be an accumulation of the number of revolutions of a drive shaft.

In step S504, the reliability specification reader 144 reads a standard maintenance number from the reliability specification storage unit 142. The standard maintenance number is a number at which the product needs maintenance if the product is used under normal conditions.

In step S506, the information comparator 154 compares the number read by the reader 134 with the standard maintenance number read by the reader 144.

In step S510, the information comparison manager 156 receives from the information comparator 154 a comparison result indicating that the number is greater than the standard maintenance number and instructs the maintenance information reader 122 to read maintenance information. The reader 122 reads the maintenance information corresponding to the standard maintenance number from the maintenance information storage unit 124, and in step S512, transmits the read information from the information transmitter 104. The maintenance information is information related to maintenance such as "Replace rubber packing of the door" in the case of the refrigerator. The maintenance information is transmitted to a product if the value of a maintenance item such as the number of times of use of a part of the product or the product itself is greater than a predetermined value. For example, the maintenance information is transmitted to a refrigerator if the number of times that the door has been opened and closed is greater than 100,000.

In step S514, the information comparison manager 156 receives from the information comparator 154 a comparison result indicating that the number is below the standard maintenance number and instructs the maintenance information reader 122 to read a no-maintenance-needed notice. The reader 122 reads the no-maintenance-needed notice from the maintenance information storage unit 124, and in step S514, transmits the same from the transmitter 104.

A remedial information notifying process according to an embodiment of the present invention will be explained with reference to FIG. 7.

Figure 7:
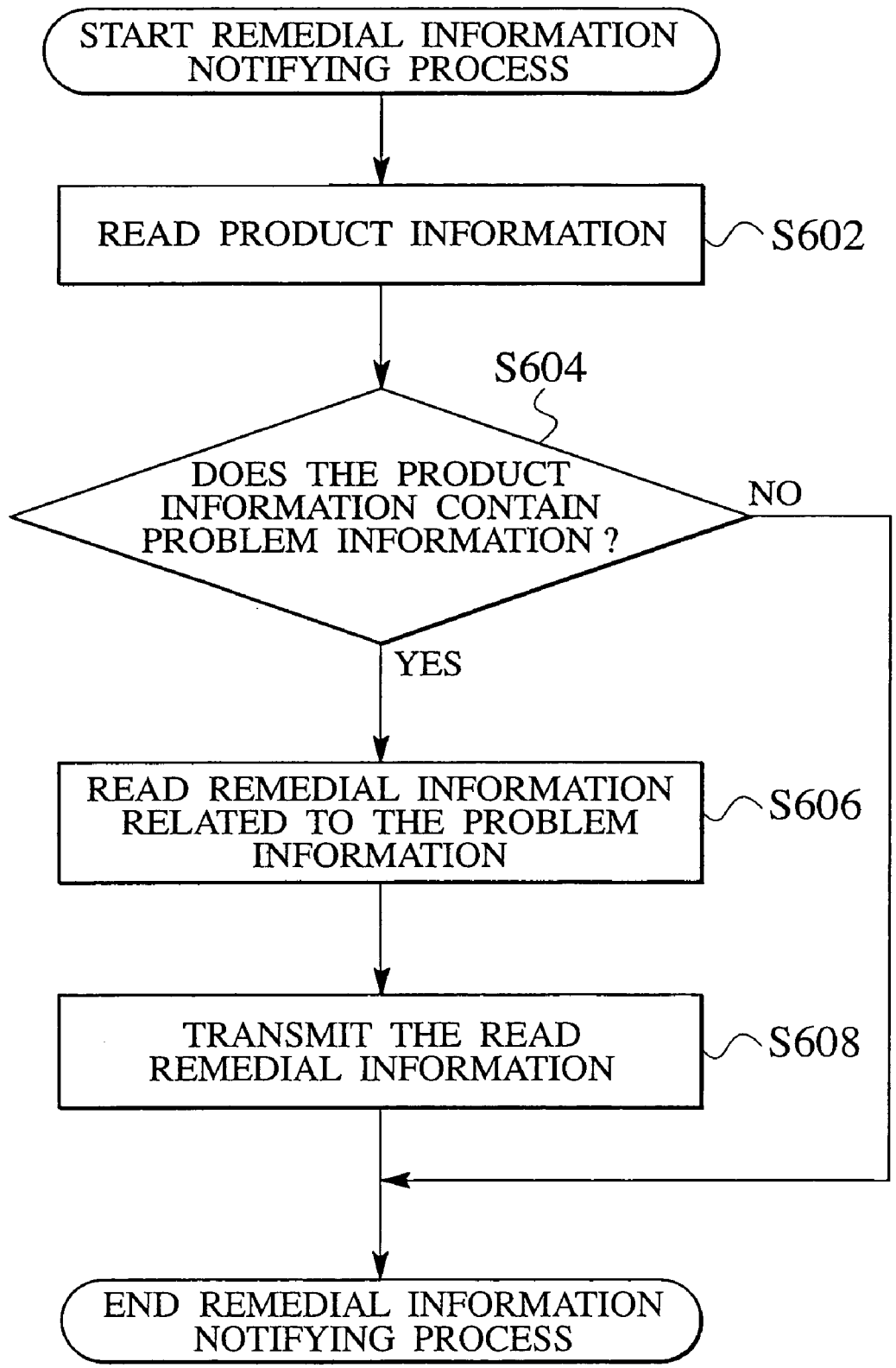
FIG. 7 is a flowchart showing a process of notifying remedial information according to an embodiment of the present invention.

In FIG. 7, step S602 reads product information. Step S604 determines whether the product information contains problem information. If it contains problem information, step S606 reads remedial information corresponding to the problem information, and step S608 transmits the read remedial information to the product (originator) that has transmitted the product information containing the problem information.

More precisely, the product information receiver 102 of FIG. 2 receives first product information from a first product in use and second product information from a second product in use. The problem information storage unit 114 stores problem information and corresponding remedial information in advance. The problem checker 112 checks to see if any one of the first and second product information parts contains problem information and provides a check result. If the check result indicates that at least one of the first and second product information parts contains problem information, the problem information reader 116 reads corresponding remedial information from the storage unit 114. The read remedial information is transmitted to each of the first and second products through the information transmitter 104.

Although the number of products in this example is two for the sake of simplicity of explanation, it is not limited to two but is optional. According to an embodiment of the present invention, several thousands or several tens of thousands of products transmit several thousands or several tens of thousands of product information parts to the apparatus 100 of FIG. 2. Even if only one of the information parts contains problem information, the embodiment transmits remedial information corresponding to the problem information to all of the products.

A criterion used to find problem information is preferably prepared for each type of product. The problem information includes urgent information such as information concerning ignition or failure that must be notified to every user. The remedial information includes, for example, "Stop using immediately," "Do not use the function X," or "Do not use under the condition of X."

The storage units including the product information storage unit 132, reliability specification storage unit 142, maintenance information storage unit 124, and problem information storage unit 114 may be semiconductor memories such as dynamic random access memories (DRAMs), magnetic disk drives such as hard disk drives (HDDs), optical disk drives such as DVD (digital versatile disk) drives, or magneto-optical disk drives such as MO (magneto-optical) disk drives. These storage units including the product information storage unit 132, etc., may be individual units or may be integrated as a single unit.

As mentioned above, any embodiment according to the present invention is capable of computing reliability specification values according to information collected from several tens or hundreds of thousands of products in use, and based on the computed values in large number, rewriting or changing initial reliability specification values provided by, for example, a manufacturer based on a small amount of data. As the number of information parts collected increases, the accuracy of the reliability specification values improves.

With the use of the accurate reliability specification values, an embodiment according to the present invention can determine whether maintenance is needed or whether a problem has occurred. A maintenance criterion based on the initial specification values tends to transmit maintenance information earlier to rigorously secure safety. In this case, even if a product is still usable, it will be determined that the product needs maintenance and that usable parts of the product must be replaced or abandoned.

Instead, an embodiment according to the present invention provides each user with maintenance information according to accurate reliability specification values calculated from data collected from products in use. As a result, products or parts can be used to their maximum service lives to save resources.

Generally, the maintenance timing of a product is determined on an assumption that the product is used in normal environments. If the product is used in unusual environments, for example, severer or lighter environments than the normal environments, the maintenance timing will be too early or too late for the product.

An embodiment according to the present invention is capable of issuing maintenance information for a product with proper timing even if the product is used under unusual environments.

Determining whether a product has a problem based on initial reliability specification values tends to easily provide an affirmative conclusion to rigorously secure safety.

An embodiment of the present invention determines whether a product has a problem according to accurate reliability specification values computed from information collected from products in use, so as to use products and parts to their maximum service lives without trouble.

If a part of a product causes trouble or reaches the end of its service life and if the user of the product determines to scrap the product, an embodiment of the present invention would have already identified the part that caused trouble or reached the end of its service life, and therefore, the user can recycle the other parts except the troubled part.

Various modifications will become possible for those skilled in the art after receiving the teaching of the present disclosure without departing from the scope thereof.

What is claimed is:

1. An apparatus for managing a plurality of products, comprising:
   a receiver configured to receive product information including measured values from at least two products in use, wherein the products are of a same type;
   an average computation unit configured to compute an average of the measured values collected from the products;
   a storage unit configured to store a reliability specification value and a reliability specification rewrite condition;
   a comparator configured to compare the computed average with the reliability specification value and provide a first comparison result; and
   a rewrite unit configured to rewrite the reliability specification value with the computed average when the first comparison result indicates that the reliability specification rewrite condition is satisfied.

2. The apparatus of claim 1, wherein:
   the reliability specification rewrite condition includes a deviation of the computed avenge from the corresponding reliability specification value at least by a predetermined percentage;
   the comparator compares the computed average with a corresponding reliability specification value, wherein the corresponding reliability specification value is either a first corresponding reliability specification value equal to (1+a predetermined value/100) or a second corresponding reliability specification value equal to (1− the predetermined value/100), and provides the first comparison result; and the rewrite unit rewrites the reliability specification value when the first comparison result indicates the computed average being above the first corresponding reliability specification value (1+ the predetermined value/100) or the computed average being below the second corresponding reliability specification value (1− the predetermined value/100).

3. The apparatus of claim 1, wherein the average computation unit determines the number of the products that have transmitted the measured values, wherein:
the storage unit stores a threshold number;
the comparator compares the counted number with the threshold number and provides a second comparison result; and
the rewrite unit rewrites the reliability specification value only when the second comparison result indicates that the counted number is above the threshold number.

4. A method of managing products carried out with an apparatus for receiving product information from the products, comprising:
receiving product information including measured values from at least two products in use, wherein the products are of a same kind;
computing an average of the measured values collected from the products;
storing a reliability specification value and a reliability specification rewrite condition;
comparing the computed average with the reliability specification value and providing a first comparison result; and
rewriting the stored corresponding reliability specification value with the computed average when the first comparison result indicates that the reliability specification rewrite condition is satisfied.

5. The method of claim 4, wherein:
the first comparison result is provided by comparing the computed average with a corresponding reliability specification value, wherein the corresponding reliability specification value is either a first corresponding reliability specification value equal to (1+a predetermined value/100) or a second corresponding reliability specification value equal to (1− the predetermined value/100); and,
the rewriting is carried out when the first comparison result indicates the computed average being above the first corresponding reliability specification value (1+ the predetermined value/100) or the computed average being below the second corresponding reliability specification value (1− the predetermined value/100).

6. The method of claim 4, further comprising:
determining the number of the products that have transmitted the measured values;
comparing the counted number with a threshold number and providing a second comparison result; and
carrying out the rewriting when the second comparison result indicates that the counted number is above the threshold number.

7. A computer program product for managing a plurality of products, comprising:
instructions configured to receive product information including measured values from at least two products in use, wherein the products are of a same type;
instructions for computing an average of the measured values collected from the products;
instructions configured to compare the computed average with a reliability specification value stared and provide a first comparison result; and
instructions configured to rewrite the stored reliability specification value with the computed average when the first comparison result indicates that a reliability specification rewrite condition stored is satisfied.

8. The computer program product of claim 7, wherein:
the instructions configured to compare the computed average with a stored reliability specification value, wherein the stored reliability specification value is either a first stored reliability specification value equal to (1+a predetermined value/100) or a second stored reliability specification value equal to (1− the predetermined value/100), and provide the first comparison result; and
the instructions configured to rewrite the stored reliability specification value when the first comparison result indicates the computed average being above the first stored reliability specification value (1+ the predetermined value/100) or the computed average being below the second stored reliability specification value (1− the predetermined value/100).

9. The computer program product of claim 7, further comprising:
instructions configured to determine the number of the products that have transmitted the measured values; and
instructions configured to compare the counted number with a threshold number stored and provide a second comparison result, wherein:
the instructions configured to rewrite rewrites the stored reliability specification value only when the second comparison result indicates that the counted number is above the threshold number.

* * * * *